(12) United States Patent  
Kay

(10) Patent No.: US 8,226,356 B2
(45) Date of Patent: Jul. 24, 2012

(54) AIR INTAKE FOR A TURBOCHARGER FOR AN INTERNAL COMBUSTION ENGINE

(75) Inventor: Peter Kay, Navenby (GB)

(73) Assignee: Napier Turbochargers Limited, Lincoln, Lincolnshire (GB)

( * ) Notice: Subject to any disclaimer, the term of this patent is extended or adjusted under 35 U.S.C. 154(b) by 1158 days.

(21) Appl. No.: 11/920,672

(22) PCT Filed: May 24, 2006

(86) PCT No.: PCT/EP2006/062610
§ 371 (c)(1),
(2), (4) Date: Nov. 19, 2007

(87) PCT Pub. No.: WO2006/128827
PCT Pub. Date: Dec. 7, 2006

(65) Prior Publication Data
US 2009/0104024 A1    Apr. 23, 2009

(30) Foreign Application Priority Data

May 28, 2005  (GB) .................................. 0510994.7

(51) Int. Cl.
*F04D 29/66*  (2006.01)
(52) U.S. Cl. ........................... 415/119; 415/160
(58) Field of Classification Search ............... 415/119, 415/160, 163, 164, 165, 161
See application file for complete search history.

(56) References Cited

U.S. PATENT DOCUMENTS

| 3,853,428 | A | * | 12/1974 | Hayden et al. ............ 416/231 R |
| 4,880,351 | A | * | 11/1989 | Inoue et al. .................. 415/164 |
| 5,399,064 | A |   | 3/1995 | Church et al. |
| 5,460,474 | A |   | 10/1995 | Iles |
| 2005/0005606 | A1 |   | 1/2005 | Vrbas et al. |

FOREIGN PATENT DOCUMENTS

| FR | 2 794 492 A1 | 12/2000 |
| GB | 701 557 A | 12/1953 |
| GB | 1449186 | 9/1976 |
| JP | 58210324 A | 12/1983 |
| JP | 59141358 (U) | 9/1984 |
| JP | 62014134 (U) | 1/1987 |
| JP | 8284899 | 10/1996 |
| JP | 2876000 (B1) | 3/1999 |
| JP | 2002227654 A | 8/2002 |
| JP | 2004360547 (A) | 12/2004 |
| SU | 853187 | 8/1981 |
| WO | 9105157 | 6/1991 |
| WO | WO 01/50000 A1 | 7/2001 |
| WO | WO 2004/038229 A1 | 5/2004 |

* cited by examiner

*Primary Examiner* — Dwayne J White
(74) *Attorney, Agent, or Firm* — Egbert Law Offices PLLC

(57) ABSTRACT

Disclosed is an air intake for a turbocharger for an internal combustion engine, said air intake including a series of variable position guide vanes for directing the air such that it is swirling in a rotational sense on reaching the impeller of the compressor of the turbocharger. The variable position guide vanes are made comprised of sound absorbent material such as to achieve a substantial reduction in turbocharger noise at the air intake.

6 Claims, 6 Drawing Sheets

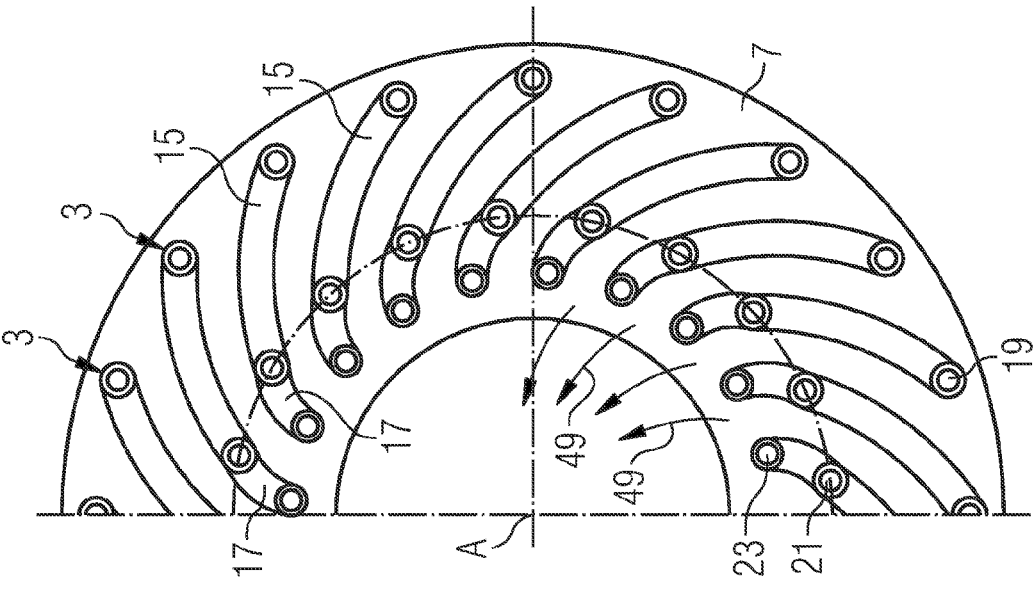
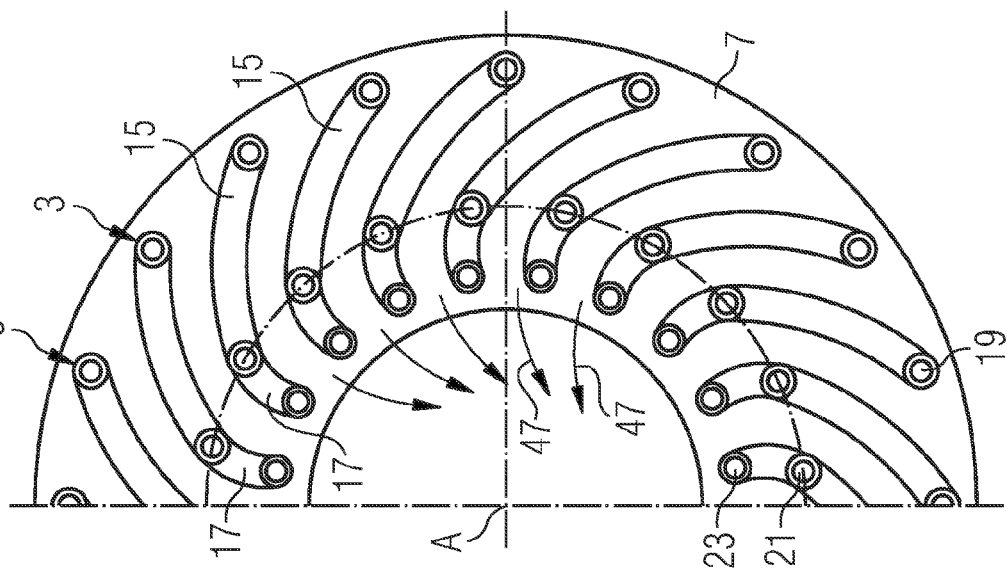

US 8,226,356 B2

AIR INTAKE FOR A TURBOCHARGER FOR AN INTERNAL COMBUSTION ENGINE

CROSS REFERENCE TO RELATED APPLICATIONS

This application is the US National Stage of International Application No. PCT/EP2006/062610, filed May 24, 2006 and claims the benefit thereof. The International Application claims the benefits of British application No. 0510994.7 GB filed May 28, 2005, both of the applications are incorporated by reference herein in their entirety.

FIELD OF INVENTION

The present invention relates to an air intake for a turbocharger for an internal combustion engine, e.g. a diesel engine.

BACKGROUND OF INVENTION

Air intakes perform the following functions: they filter the air; they guide the air prior to it reaching the impeller of the compressor of the turbocharger; and they attenuate the noise produced by the turbocharger as emitted by the air inlet to the air intake.

The noise attenuation is achieved through the use of baffle structures and acoustically absorbent lining in the air intake.

A problem arises that the geometrical form of the baffle structures is not ideal across the full operating range of the turbocharger/engine. The directing of the air by the baffle structures is such that the air approaches the impeller in a certain direction. This certain direction is not ideal at the extremes of the operating range of the turbocharger/engine. This results in a reduction in turbocharger/engine efficiency as well as increased noise at these extremes.

It is known to add a variable guide vane arrangement to the air intake to direct the air dependent on operation of the turbocharger/engine so that the air approaches the impeller in a direction best suited to turbocharger/engine operation. However, the addition to the air intake of a further component, together with its associated aerodynamic loss, has the undesirable effect of increasing overall aerodynamic loss in the air intake. Further, existing variable guide vane arrangements are complex and expensive.

SUMMARY OF INVENTION

According to the present invention there is provided an air intake for a turbocharger for an internal combustion engine, the air intake including a series of variable position guide vanes for directing the air such that it is swirling in a rotational sense on reaching the impeller of the compressor of the turbocharger, wherein the variable position guide vanes are made comprised of sound absorbent material such as to achieve a substantial reduction in turbocharger noise at the air intake.

Preferably, each variable position guide vane comprises more than one vane part, the vane parts being movable relative to one another, the relative movement of the vane parts of the variable position guide vanes effecting variation in the amount and/or rotational sense of the swirl applied by the variable position guide vanes.

The vane parts comprising each variable position guide vane may include a fixed vane part.

Preferably, each variable position guide vane comprises two vane parts.

In the air intake described below by way of example, each variable position guide vane comprises a fixed vane part and a movable vane part, movement of the movable vane parts of the variable position guide vanes effecting variation in the amount and/or rotational sense of the swirl applied by the variable position guide vanes.

Further, in the air intake described below, the series of variable position guide vanes are arranged in a circle, and the fixed vane parts of the guide vanes are disposed radially outward of the movable vane parts of the guide vanes.

Further, in the air intake described below, in each variable position guide vane the fixed vane part and the movable vane part are secured end to end, and the movable vane part is rotatable about an axis perpendicular to the plane of the circle, which axis is located at the securing end to end of the fixed and movable vane parts.

In each variable position guide vane the fixed and movable vane parts are suitably secured end to end in the form of a hinge, the axis of the hinge constituting the axis perpendicular to the plane of the circle.

In each variable position guide vane both the fixed and movable vane parts suitably comprise a perforated metal sheet envelope containing sound absorbent material.

BRIEF DESCRIPTION OF THE DRAWINGS

The invention will now be described, by way of example, with reference to the accompanying drawings, in which:

FIGS. 6 and 7 are half sections corresponding to FIG. 2, and illustrate the series of variable position guide vanes in operation.

DETAILED DESCRIPTION OF INVENTION

Figure 1:
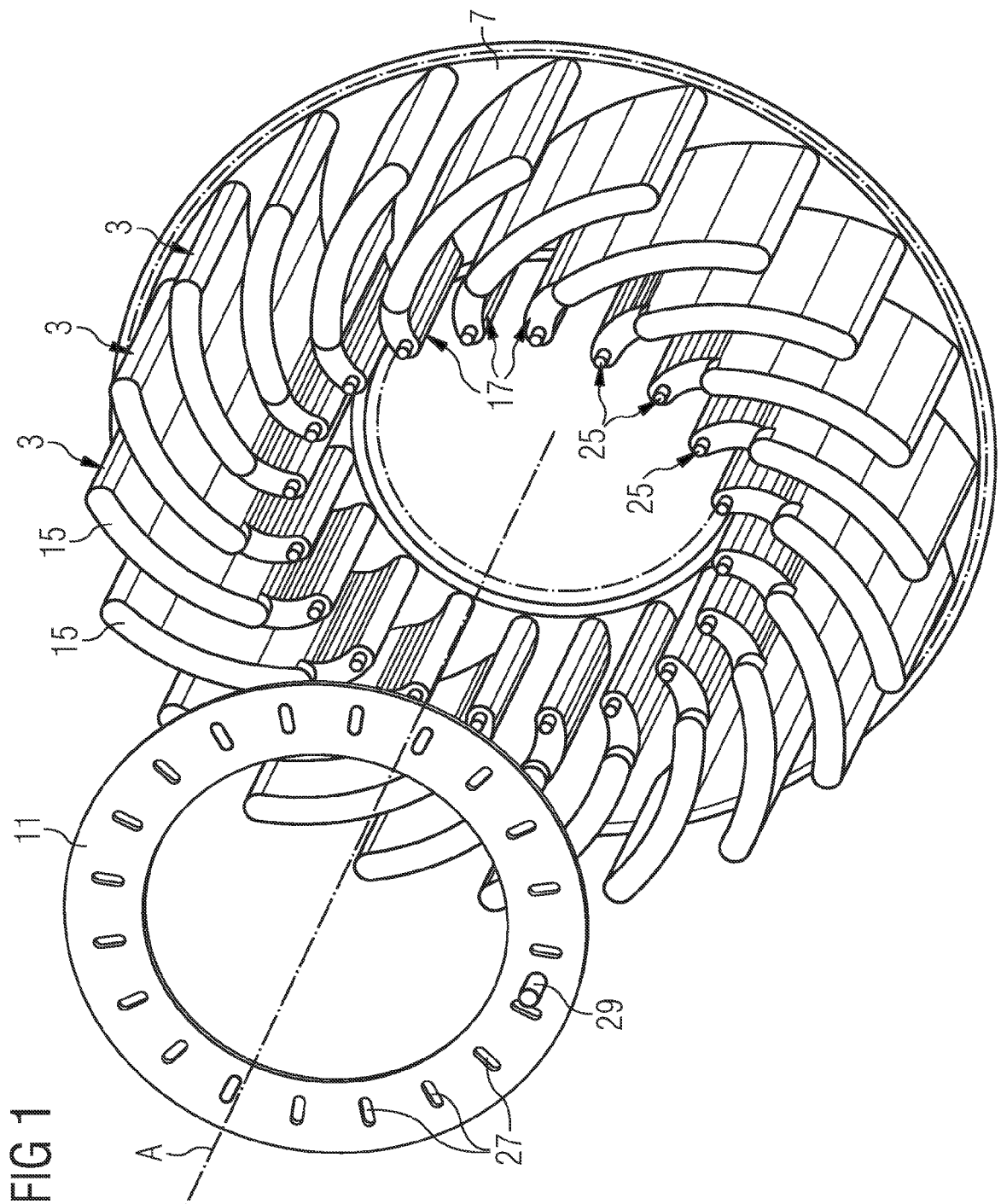
FIG. 1 is an exploded perspective view of a portion of an air intake according to the present invention, which portion includes a series of variable position guide vanes.

Referring to FIGS. 1 to 4, the air intake 1 comprises: a series of variable position guide vanes 3 arranged in a circle about an axis A; an end cover 5 and an outlet flange 7 between which guide vanes 3 are secured; a foam air filter 9 that extends circumferentially around the circle of guide vanes 3; a location ring 11; and an actuator 13.

Each variable position guide vane 3 comprises a fixed vane part 15 and a movable vane part 17. Each fixed vane part 15 includes at its radially outer end a first post 19. Further, each vane part 15 includes at its radially inner end a second post 21. First and second posts 19, 21 secure vane parts 15 in position between end cover 5 and outlet flange 7. Each movable vane part 17 at its radially outer end shares the second post 21 of its associated fixed vane part 15. Each movable vane part 17 is able to rotate about its respective second post 21. Each vane part 17 includes at its radially inner end a third post 23, which post 23 includes a spigot 25.

The spigots 25 of the third posts 23 locate into respective slots 27 in location ring 11. Location ring 11 includes a projection 29, which projection extends through an aperture in end cover 5. Actuator 13 is connected to projection 29. Actuator 13 is able to rotate location ring 11 in a clockwise or anticlockwise sense about axis A. This in turn moves spigots 25 and third posts 23 circumferentially around axis A, thereby rotating each movable vane part 17 by the same amount and in the same clockwise/anticlockwise sense about its respective second post 21.

Figure 5:
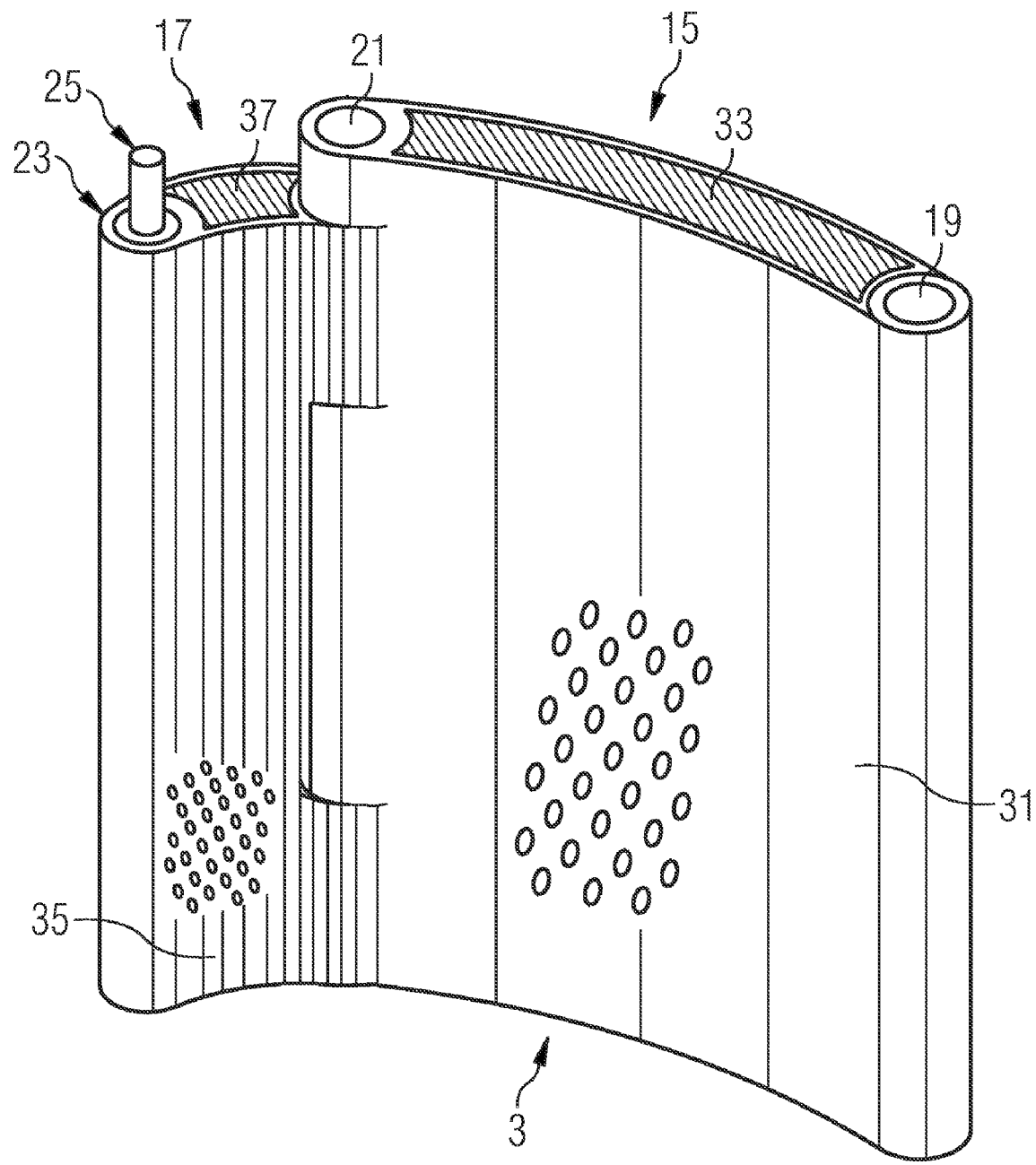
FIG. 5 is a perspective view of a single variable position guide vane of the series of such guide vanes.

Referring also to FIG. 5, the fixed vane part 15 of each variable position guide vane 3 comprises a curved perforated steel sheet envelope 31 that extends between the first and second posts 19, 21, and contained within the envelope a sound absorbent foam mass 33. Similarly, the movable vane part 17 of each variable position guide vane 3 comprises a curved perforated steel sheet envelope 35 that extends between the second and third posts 21, 23, and contained within the envelope a further sound absorbent foam mass 37. The fixed and movable vane parts 15, 17 share second post 21 by forming a hinge thereat.

Figure 2:
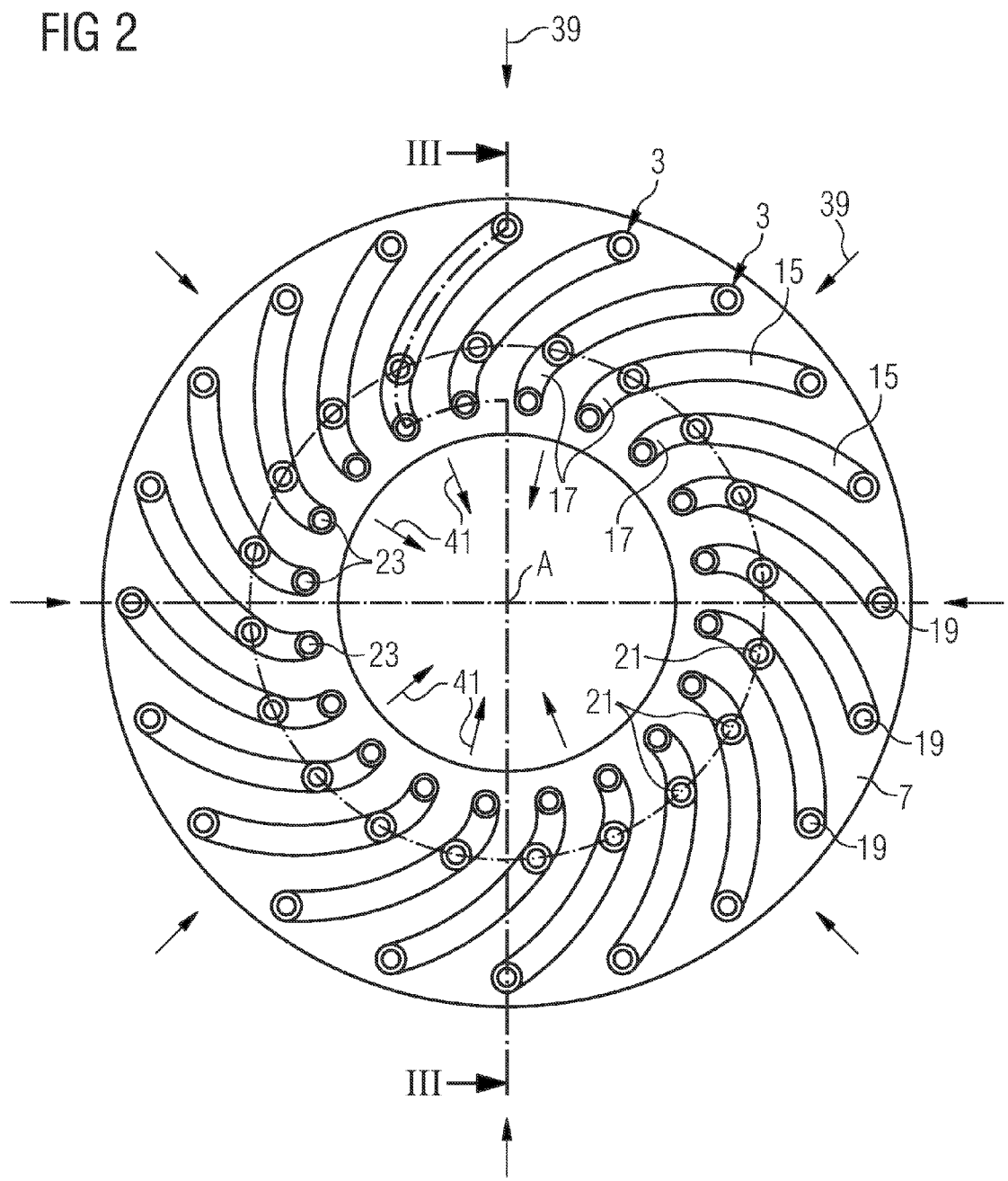
FIG. 2 is a section through the air intake according to the present invention, which section omits an air filter of the air intake.
Figure 3:
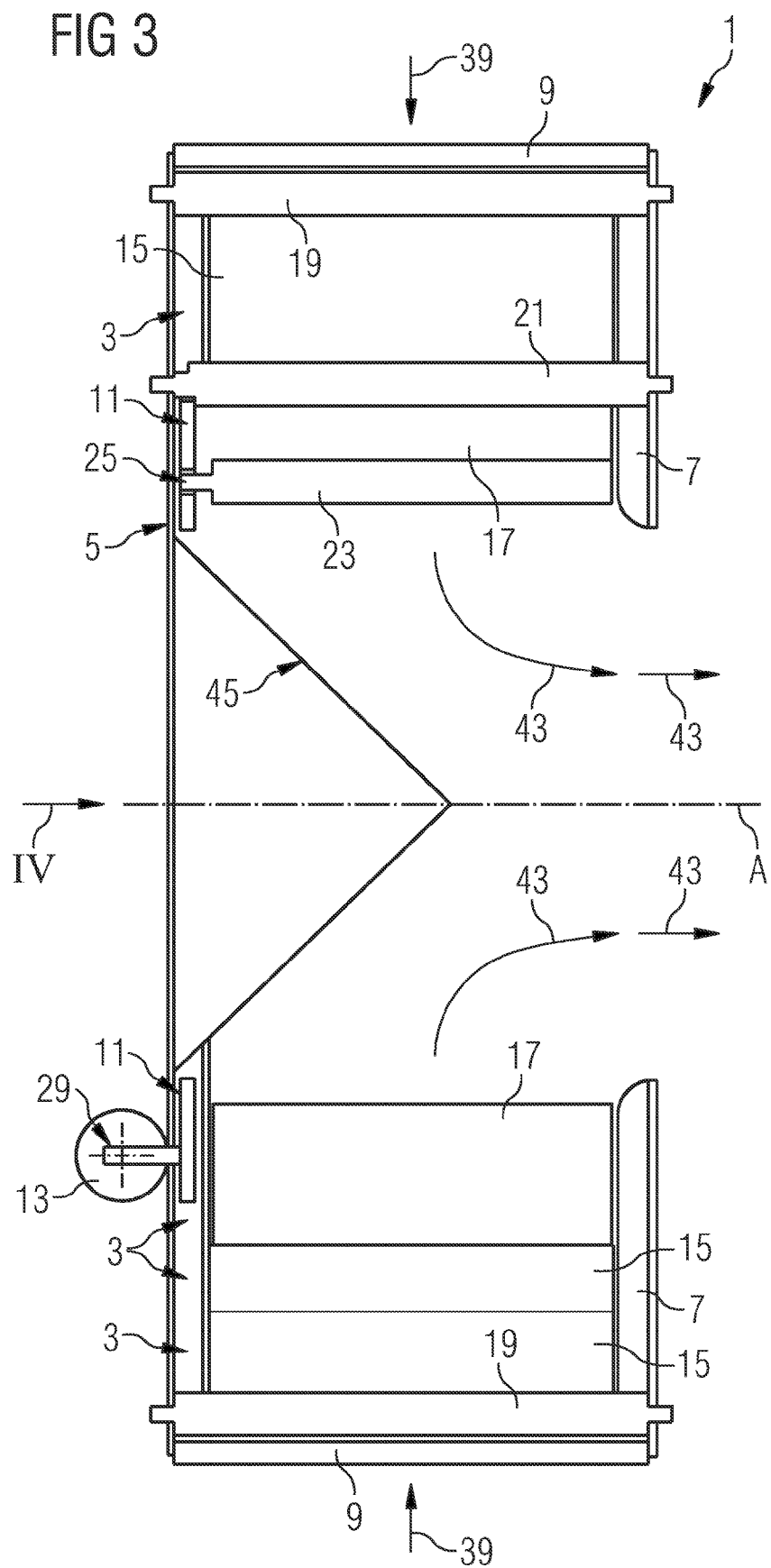
FIG. 3 is a section taken on the line III-III in FIG. 2.
Figure 4:
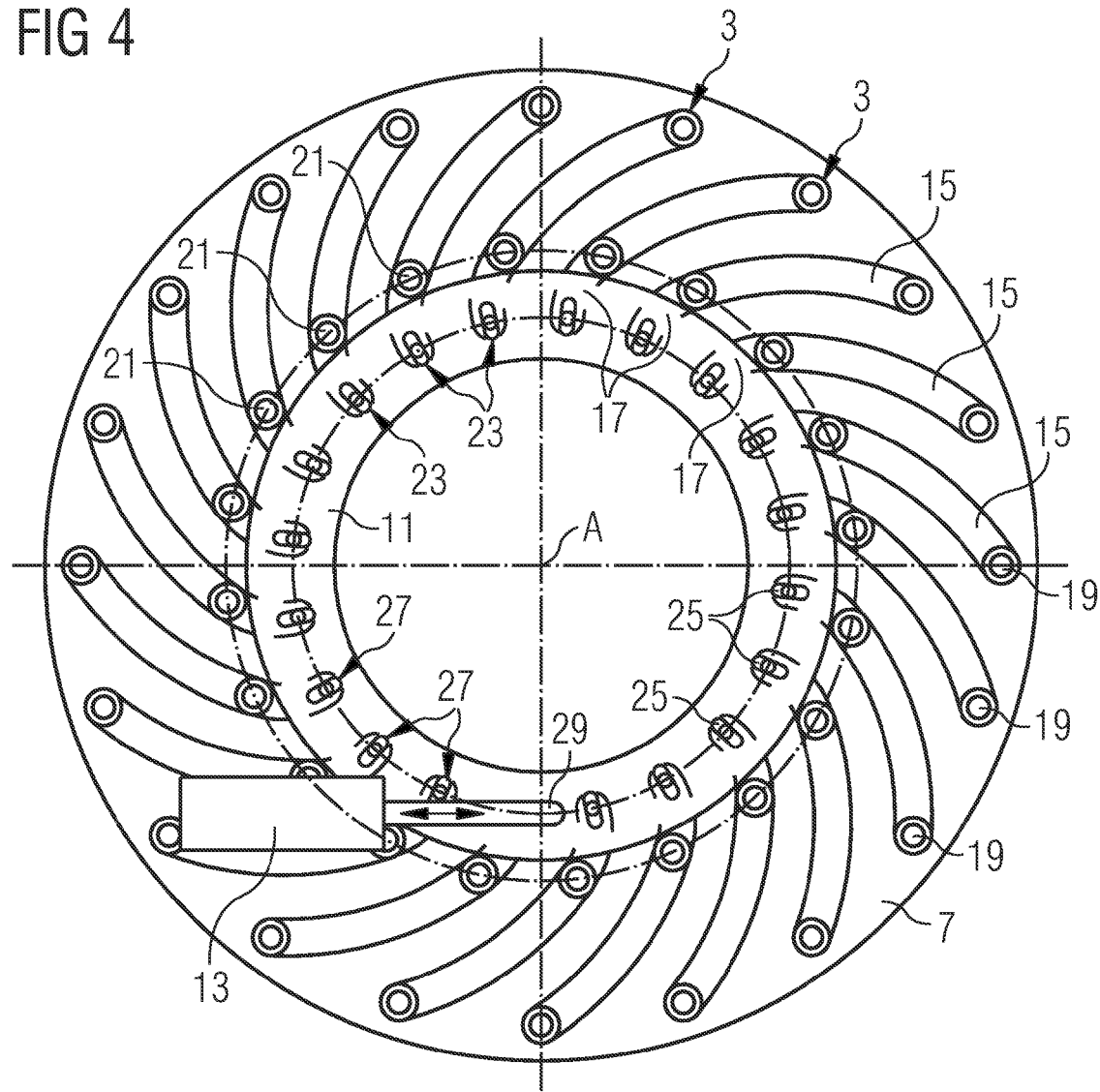
FIG. 4 is a view on the arrow IV in FIG. 3 with an end cover of the air intake removed.

In operation of the air intake, rotation of the impeller of the compressor of the turbocharger (this impeller would be located to the right in FIG. 3 and would rotate about axis A) causes air to be drawn radially inwardly in the direction of arrows 39 in FIGS. 2 and 3. The air travels through foam air filter 9 and guide vanes 3, and between end cover 5 and outlet flange 7. Guide vanes 3 direct the air so as to cause it swirl in a clockwise or anticlockwise sense about axis A, or not at all, as the air is drawn towards the impeller. The amount and sense of the swirl is determined by the setting of the movable vane parts 17 of guide vanes 3. Arrows 41 in FIG. 2 indicate that the setting of movable vane parts 17 in FIG. 2 is such that no swirl is applied by guide vanes 3. Arrows 43 in FIG. 3 indicate the drawing of the air towards the impeller. A conical protrusion 45 in end cover 5 assists in the aerodynamics of the air intake.

In FIG. 2 movable vane parts 17 occupy their mid-position. In this position guide vanes 3 apply no swirl. FIGS. 6 and 7 show the settings of movable vane parts 17 such that guide vanes 3 apply clockwise and anticlockwise swirl respectively, as indicated by arrows 47, 49. Thus, to achieve clockwise swirl, movable vane parts 17 are rotated about second posts 21 in an anticlockwise sense. Similarly, to achieve anticlockwise swirl, vane parts 17 are rotated about posts 21 in a clockwise sense. The amount of clockwise/anticlockwise swirl applied of course depends on the degree of rotation of vane parts 17.

The setting of movable vane parts 17 is determined according to the operating state of the turbocharger/engine. This setting is of course adjusted by operation of actuator 13. The setting is chosen so that the swirl applied by guide vanes 3 is such that the air approaches the impeller in a direction as desired for the particular state of operation. It is to be noted that by having the capability of applying both clockwise and anticlockwise swirl, variable position guide vanes 3 are able to apply swirl that is in the same sense or the opposite sense to that in which the impeller rotates. Thus, guide vanes 3 are able to apply so called positive (same sense) or negative (opposite sense) swirl of varying amounts prior to the impeller, as required according to operation of the turbocharger/engine.

In accordance with the present invention, guide vanes 3, in addition to being able to apply varying amounts of clockwise/anticlockwise swirl, also operate to attenuate turbocharger noise that would otherwise be emitted by the air inlet to the air intake. Guide vanes 3 have this property by virtue of their construction comprised of sound absorbent material.

It is to be appreciated that the air intake described above incorporates into one and the same component (i.e. the series of variable position guide vanes 3) both the operation of applying varying amounts of clockwise/anticlockwise swirl and the operation of absorbing sound. Thus, the overall aerodynamic loss of the air intake is reduced as compared to an air intake in which these two operations are carried out by separate dedicated components.

In the air intake described above, each variable position guide vane 3 comprises two vane parts 15, 17, one movable, the other not, and both made comprised of sound absorbent material. It is to be realised that each variable position guide vane could comprise only one vane part, which vane part is both movable and made comprised of sound absorbent material, thereby to have the dual property of being able to apply varying amounts of clockwise/anticlockwise swirl and absorb sound.

In the air intake described above, each variable position guide vane 3 comprises two vane parts 15, 17, one movable, the other not. It is to be realised that these two vane parts could both be movable, moving in synchronised relation in order to apply the required amount of clockwise/anticlockwise swirl.

In the air intake described above, each variable position guide vane 3 comprises two vane parts 15, 17. It is to be realised that each variable position guide vane could comprise three or more vane parts.

In the air intake described above, in each variable position guide vane 3, fixed and movable vane parts 15, 17 are hinged together. It is to be realised that this hinge may be omitted, and vane parts 15, 17 disposed separately but closely adjacent. Thus, fixed vane part 15 would extend as before from first post 19 to second post 21, but movable vane part 17 would not share second post 21. Movable vane part 17 would rotate about a further post positioned closely adjacent second post 21.

In the air intake described above, in each variable position guide vane 3, fixed and movable vane parts 15, 17 are of the same construction. It is to be realised that their construction may be different provided the resulting series of variable position guide vanes achieves the required turbocharger noise reduction. For example, and provided the required noise reduction can be achieved, movable vane part 17 might be made of a non-sound absorbent material.

In the air intake described above, each variable position guide vane 3 comprises a fixed vane part 15 and a movable vane part 17, both parts sound absorbent, and variation in the amount/direction of the swirl applied is achieved by rotating the movable vane part 17. It is to be realised that this two-part guide vane 3 could be replaced by a one-part guide vane comprising a single vane of laminar form, made of sound absorbent material, and having the property that it is able to flex or bow thereby to achieve the required variation in the amount/direction of the swirl applied. The flexing or bowing could suitably be realised by substantially circumferential movement about the axis A of one or both of the radially inner/outer ends of the single vane.

The invention claimed is:

1. An air intake for a turbocharger for an internal combustion engine, the air intake comprising:
   a series of variable position guide vanes for directing air such that the air swirls rotationally upon reaching an impeller of a compressor of the turbocharger, said series of variable position guide vanes being formed of a sound absorbent material, each guide vane of said series of variable position guide vanes having a fixed vane part and a movable vane part, a movement of the movable vane parts effecting a variation in an amount or the rotational swirling applied by said series of variable position guide vanes, said series of variable position guide vanes being arranged in a circle, the fixed vane parts being disposed radially outwardly of the movable vane parts.

2. The air intake of claim 1, the fixed vane part being secured to the movable vane part in end-to-end relationship, the movable vane part being rotatable about an axis perpendicular to a plane of the circle, said axis being located at the end-to-end securing of the fixed vane particular and the movable vane part.

3. The air intake of claim 2, the fixed vane part being secured by a hinge in end-to-end relationship with the movable vane part, the axis of said hinge being said axis perpendicular to said plane of the circle.

4. An air intake for a turbocharger for an internal combustion engine, the air intake comprising:

a series of variable position guide vanes for directing air such that the air swirls rotationally upon reaching an impeller of a compressor of the turbocharger, said series of variable position guide vanes being formed of a sound absorbent material, each guide vane of said series of variable position guide vanes having a fixed vane part and a movable vane part, both said fixed vane part and said movable vane part of each variable position guide vane of said series of variable position guide vanes comprising a perforated metal sheet envelope containing the sound absorbent material.

5. The air intake of claim 3, wherein both said fixed vane part and said moveable vane part of each variable position guide vane of said series of variable position guide vanes comprise a perforated metal sheet envelope containing the sound absorbent material.

6. The air intake of claim 4, wherein a movement of the moveable vane part effects a variation in an amount of the rotational swirling applied by said series of variable position guide vanes.

* * * * *